Patented Oct. 8, 1940

2,216,755

UNITED STATES PATENT OFFICE 2,216,755

TREATMENT OF REFINING SIRUPS

Pedro Sanchez, Habana, Cuba

No Drawing. Application October 1, 1938,
Serial No. 232,877

4 Claims. (Cl. 127—48)

The present invention relates to the treatment of refinery sirups and raw sugar washings in order to render these solutions suitable for boiling high grade sugar therefrom.

In general, in the preparation of refined sugar, a raw sugar is washed or affined with an impure sugar sirup, the function of which is to render mobile the encasing surface of molasses of the raw sugar crystal, thus removing a substantial portion of impurities prior to color elimination proper. The affination sirup or raw sugar washings, therefore, contain the impurities and in course of use the non-sugar values build up in the solution to a point where it is no longer advantageous to utilize the affination sirup for further washing. In order to obtain the sugar values from such sirups, they have been sent heretofore, to the so-called remelt station where raw sugar is crystallized from the affination sirup, the raw sugar being reintroduced into the process of refining along with the incoming raw sugar.

Another refinery sirup is obtained after the washed raw sugar has been melted, the solution decolorized and the decolorized solution sent to the vacuum pans for boiling. The sirup obtained after several boilings increases in color as impurities are built up and a sirup is finally obtained from which no further boilings of refined sugar can be obtained. Like the raw sugar washings, these sirups have been sent heretofore to the remelt station for the preparation of so-called remelts or raw sugars. In a co-pending application Serial No. 227,209, filed August 27, 1938, the effect of a treatment with hypochlorite upon colored sugar solutions that have previously been treated with hypochlorite to decolorize them, but which have reacquired color, has been described.

In accordance with the procedures of the present invention a method is provided for treating refinery sirups such as affination sirup and white sugar run-off, the latter obtained from sugar solutions initially treated with hypochlorite and from which refined sugar has been crystallized, whereby these refinery sirups can be utilized for the preparation of sugars of excellent quality, very superior to raw sugar but not meeting the specifications of refined white crystal sugar.

In practicing this invention the two different sirups, that is, the affination sirup and the white sugar run-off, are kept separate and are separately treated by two different procedures, inasmuch as the two sirups are quite different in nature, and the sirups so treated may then be combined and boiled.

The white sugar run-off is treated by diluting the same to a Brix of approximately 65; it is then treated with a quantity of hypochlorite sufficient to produce an 85–90% decolorization. The exact amount of hypochlorite necessary depends on the color of the sirup and its purity but in general, 0.05% to 0.2% is sufficient to obtain the desired decolorization of 85–90%. In most instances it is found advantageous to eliminate the positive ion of the hypochlorite by the use of an acid or acid salt reacting therewith to produce a precipitate in the solution. While acid or acid salts are available, monocalcium phosphate has been found eminently suitable both from the point of view of efficiency of removal and economy of treatment.

This procedure is more fully described in Patent No. 1,989,156 granted to me on January 29, 1935.

After treatment with hypochlorite and acid or acid salt, any precipitate in the solution is removed therefrom and the decolorized and brilliant sirup is then available for use in boiling high quality sugar. As stated above, the raw sugar washings or affination sirups are treated separately. This sirup is diluted to about 60 Brix and defecated or clarified with suitable defecants, as for instance, lime phosphate, aluminum compounds and the like. For instance, as a defecant mono-calcium phosphate equivalent to about 0.06% $P_2O_5$ is added and the solution then brought to a pH higher than 7 with milk of lime. The treated solution is then heated and defecated and the precipitate removed, leaving the sirup about 40% decolorized and free from suspended and colloidal impurities.

We then have two decolorized and brilliant sirups on hand from the two separated treatments given above. It is from these sirups that the high quality sugar is boiled.

As a specific example of the operation of the invention, a white sugar run-off obtained after crystallizing white crystal sugar from a washed sugar sirup decolorized in accordance with the Sucro-Blanc process described in Patent No. 1,989,156, was treated with 0.11% hypochlorite to decolorize the solution. A decolorized solution was obtained having a color of 2.6 units of color on the Horne scale as compared with an original color of 25.

In the treatment of the affination sirup obtained by washing the raw sugar used in the operation described immediately above, a quantity of mono-calcium phosphate equivalent to 0.06% $P_2O_5$ was added to the sirup and the pH brought to above 7 with milk of lime, the solution heated and filtered. The clarified solution possessed a color of 93 as compared with an original color of 156. Should, for instance, equal quantities of the decolorized run-off of color 2.5 and the clarified affination sirup of color 93 be mixed, a sirup of intermediate color of 47.8 will be obtained.

In practicing the invention either the sirups can be mixed before the crystallization of sugar from them or grain can be formed in the vacuum pan from the very light colored treated and filtered white sugar run-off and the strike completed with partially decolorized and clarified affination sirup. Irrespective of which of these methods is employed, crystallization from these sirups is carried out by usual methods until only high grade sugar and final molasses or blackstrap results.

The high grade sugar produced finds utilization for many technical purposes where the very high purity of refined white crystal sugar is not a requisite and where raw sugar is not particularly applicable. The high grade sugar of the present invention is suitable for many techanical usages where raw sugar may not be used and commands a premium over the base price of raw sugar because of its lightness in color and its freedom in solution of suspended and colloidal matter. By production of the type of sugar described the invention provides a means of increasing the capacity of a given plant due to the fact that the high grade sugar produced by the procedure stated is immediately bagged and taken out of process instead of, as remelt raws, having to be re-processed. The withdrawn high quality sugar can then be replaced with an equal quantity of incoming raw sugar.

What is claimed is:

1. The method of obtaining high grade sugar from refinery sirup resulting from sugar solutions that have been initially decolorized by hypochlorite and from which a portion of the sugar has been removed which comprises treating a run-off sirup of this origin with sufficient hypochlorite to reduce the color thereof to a substantial extent, mixing the decolorized sirup with a clarified sirup and crystallizing sugar from the mixture.

2. The method of obtaining high grade sugar from refinery sirups resulting from sugar solutions that have been initially decolorized by hypochlorite and from which a portion of the sugar has been removed which comprises treating a run-off sirup of this origin with sufficient hypochlorite to reduce the color thereof to a substantial extent, mixing the decolorized sirup with a clarified affination sirup and crystallizing sugar from the mixture.

3. The method of obtaining high grade sugar from refinery sirups resulting from sugar solutions that have been initially decolorized by hypochlorite and from which a portion of the sugar has been removed which comprises treating a run-off sirup of this origin with sufficient hypochlorite to reduce the color thereof to a substantial exent, clarifying an affination sirup, graining the decolorized run-off and completing the crystallization of sugar after addition to the decolorized run-off and the clarified affination sirup.

4. The method of refining raw sugar which comprises washing the raw sugar whereby a washed sugar and an affination sirup result, preparing a melt of the washed sugar and decolorizing the same with active chlorine, boiling sugar from the decolorized melt with the production of a colored run off, decolorizing the run off with active chlorine, clarifying the affination sirup and crystallizing sugar from the mixture.

PEDRO SANCHEZ.